(No Model.)
P. R. LAMBORN.
FLY SCREEN DOOR ATTACHMENT.
No. 302,916. Patented Aug. 5, 1884.
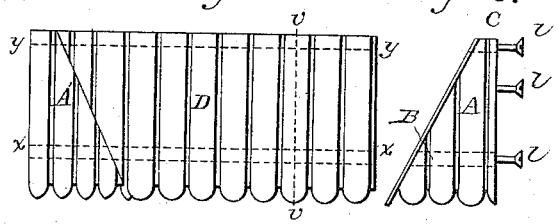
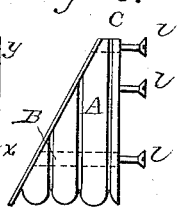
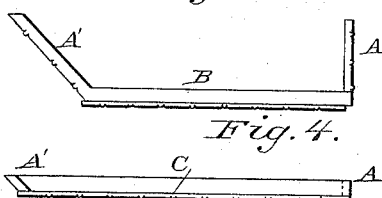
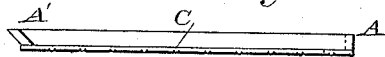
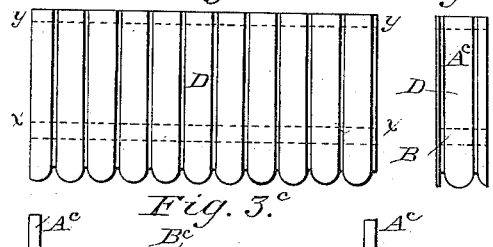
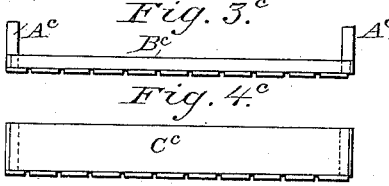
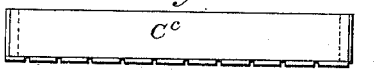
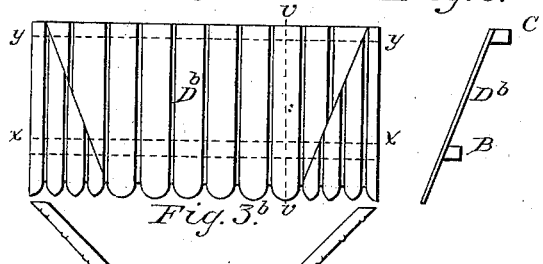
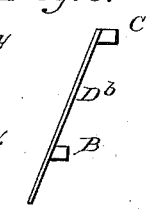
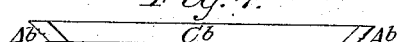
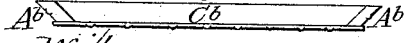
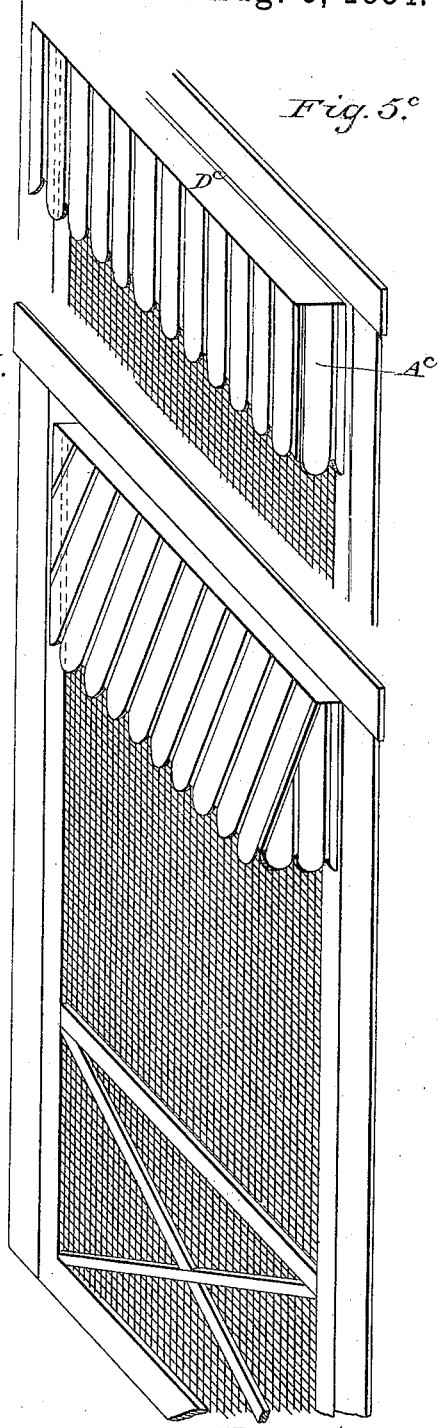
Witnesses:
E. S. Strattan
R. S. Phillips
Inventor:
Phebe R. Lamborn

UNITED STATES PATENT OFFICE.

PHEBE R. LAMBORN, OF WEST LIBERTY, IOWA.

FLY-SCREEN-DOOR ATTACHMENT.

SPECIFICATION forming part of Letters Patent No. 302,916, dated August 5, 1884.

Application filed February 28, 1884. (No model.)

*To all whom it may concern:*

Be it known that I, PHEBE R. LAMBORN, a citizen of the United States, residing at West Liberty, in the county of Muscatine, State of Iowa, have invented a new and useful Fly-Screen-Door Attachment, of which the following is a specification.

My invention relates to improvement in devices for excluding flies and other insects from rooms and buildings; and the objects of my improvements are, first, to provide for passing through doors in frequent use without disturbing and admitting flies and other insects which collect on existing forms of screen-doors; and, second, to furnish a structure and attachment at once cheaply and readily attached to existing forms of screen-doors, thereby obviating the trouble and greater expense of a specially-devised and entire new structure. I attain these objects by the construction and mechanism illustrated in the accompanying drawings, in which—

Figures 1, $1^b$, and $1^c$ are front elevations of preferable forms of the structure. Figs. 2 and $2^c$ are end elevations of preferable forms of the attachment. Figs. 3, $3^b$, and $3^c$ are sectional plans of preferable forms of the attachment on the lines $x\ x$ in Figs. 1, $1^b$, and $1^c$, relatively. Figs. 4, $4^b$, and $4^c$ are sectional plans of preferable forms of the attachment on the lines $y\ y$ in Figs. 1, $1^b$, and $1^c$, relatively. Fig. 6 is a sectional end elevation of two forms of the structure on the lines $v\ v$, Figs. 1 and $1^b$. Fig. 5 is a perspective (of the preferable form shown in Figs. 1, 2, 3, and 4) of the hood or awning attached to ordinary screen-doors by means of screws $l\ l\ l$, Fig. 2.

The figures and figures with their exponents $^b$ and $^c$ are designed to illustrate different or preferable forms of the device without limiting to a special form or combination of forms —*i. e.*, the sectional elevation, Fig. 8, may be used with either of the sectional plans Figs. 3, 4, $3^b$, $4^b$, $3^c$, $4^c$; also, the sectional or end elevation, Fig. $2^c$, may be used with either of the plans illustrated.

Similar letters refer to similar parts throughout the several views.

The ends A A′, Figs. 1, 2, 3, 4, and 5, or of either of the preferable forms $A^b$ A′ $A^c$, (indicated in Figs. $3^b$, $4^b$, $1^c$, $3^c$, $4^c$,) or their different combinations, are suitably framed and secured to the cap C or $C^b$ or $C^c$, Figs. 2, 4, or $4^b$, or $2^c$, $4^c$, and rib B or $B^b$ or $B^c$, Figs. 2, 3, or $3^b$, $2^c$, $3^c$, the end of device nearest to hinge of door being preferably made of angular form (see sectional plans, Fig. 2) of an angle less than ninety degrees to the plane of the screen-door, for the purpose and in such manner as will permit the screen-door with the hood attached to open more than or beyond ninety degrees, to the better facilitate ingress and egress through the doorway.

To the external face of the cap C or $C^b$ $C^c$, Figs. 4, $4^b$, $4^c$, and rib B or $B^b$ $B^c$, Figs. 3, $3^b$, $3^c$, is suitably secured the covering D or $D^b$ $D^c$, Figs. 1, 2, 3, 4, and 5, or $1^b$, $3^b$, $4^b$, $1^c$, $3^c$, $4^c$, and $5^c$.

The assemblage and combination of the ends A A′, Figs. 2, 3, 4, and 5, the cap C, Figs. 2, 4, rib B, Figs. 2, 3, and covering D, Figs. 1, 2, 3, 4, and 5, as described and shown, when properly attached to the screen-door, as shown in Fig. 5, together form a hood or awning under or beneath which flies and other insects attracted to the surface of the screen by warmth or culinary odors will find their way and be held while opening the screen-door, thereby preventing their persistent tendency to fly over the top of the door into the room, thus securing the purpose intended.

I am aware that prior to my invention fly-screens have been made and used directly as doors; also that traps and snares have been made to catch and retain flies. I therefore do not claim a screen or trap, severally, or their combination, broadly; but What I do claim as my invention, and desire to secure by Letters Patent, is—

1. The combination, in a fly-screen-door attachment, of the vertical end pieces, A A′, situated at a right or inclined angle with the face of the screen-door, with the cap C and rib B, suitably framed and secured together, forming a frame, preferably made of wood or metal, upon which to place a suitable covering, D, to inclose or partially inclose retaining-space, substantially as set forth.

2. The combination, in a fly-screen-door attachment, of the covering D, preferably of wood, metal, cloth, or paper, with the framed ends A A', rib B, and cap C, substantially as shown, and for the purpose specified.

3. The combination, with a screen-door, of a hood consisting of end portions and an inclined front secured to a framing, the same secured to the upper portion of the door by screws or otherwise, substantially as shown and described.

PHEBE R. LAMBORN.

Witnesses:
 A. P. LAMBORN,
 R. S. PHILLIPS.